(12) United States Patent
Davis

(10) Patent No.: US 6,986,813 B2
(45) Date of Patent: Jan. 17, 2006

(54) SPRAYED IN PLACE PIPE LINING APPARATUS AND METHOD THEREOF

(75) Inventor: Thomas Davis, Bay City, MI (US)

(73) Assignee: Visuron Technologies, Inc., Bay City, MI (US)

( * ) Notice: Subject to any disclaimer, the term of this patent is extended or adjusted under 35 U.S.C. 154(b) by 0 days.

(21) Appl. No.: 10/407,278

(22) Filed: Apr. 4, 2003

(65) Prior Publication Data
US 2004/0194697 A1 Oct. 7, 2004

(51) Int. Cl.
B05B 13/06 (2006.01)

(52) U.S. Cl. ................ 118/317; 118/323; 118/DIG. 10
(58) Field of Classification Search ................ 239/752, 239/753, 242, 222.11, 224, 104, 69, 105, 239/223; 118/317, DIG. 10, 301, 302, 323, 118/DIG. 16, 321, 305, 307, 306, 318
See application file for complete search history.

(56) References Cited

U.S. PATENT DOCUMENTS

| 2,488,195 | A | * | 11/1949 | Ivey ............................ 239/105 |
| 3,749,315 | A | * | 7/1973 | Crathern ..................... 239/224 |
| 3,774,547 | A | * | 11/1973 | Widiger et al. ............. 104/244 |
| 4,085,894 | A | * | 4/1978 | Kubo et al. .................. 239/121 |
| 5,230,842 | A | | 7/1993 | Munde |
| 5,409,561 | A | | 4/1995 | Wood |
| 5,634,743 | A | | 6/1997 | Chandler |
| 5,656,117 | A | | 8/1997 | Wood et al. |
| 5,834,075 | A | | 11/1998 | Miller |
| 6,009,912 | A | | 1/2000 | Andre |
| 6,050,499 | A | * | 4/2000 | Takayama et al. ........... 239/112 |
| 6,372,053 | B1 | * | 4/2002 | Belanger et al. .............. 134/34 |
| 6,427,726 | B1 | | 8/2002 | Kiest, Jr. |

* cited by examiner

Primary Examiner—Brenda A. Lamb
(74) Attorney, Agent, or Firm—Raggio & Dinnin, P.C.

(57) ABSTRACT

A method and apparatus for applying a liner to a pipe is disclosed. The apparatus includes a base assembly having a plurality of guide rails and a shuttle plate attached thereto. The apparatus also includes a motor module attached to an end of the base assembly. An extension arm is connected to a top surface of the shuttle plate. The extension arm has a spray head assembly attached at an opposite end thereof. The extension arm and spray head assembly will move relative to the base assembly of the apparatus. A fast cure coating will be applied via the spray head assembly to the interior surface of a pipe being rehabilitated. The spray head assembly will have an air blow off mechanism therein thus allowing for the tip of the spray head assembly to stay relatively clog free during the fast cure coating operation of the apparatus. The methodology also includes an oscillation system wherein the spray head assembly will move relative to the base assembly thus creating an over lapping pattern for the spray coating being applied to the interior surface of the pipeline. This oscillation system will allow for a more uniform coating to be applied.

17 Claims, 4 Drawing Sheets

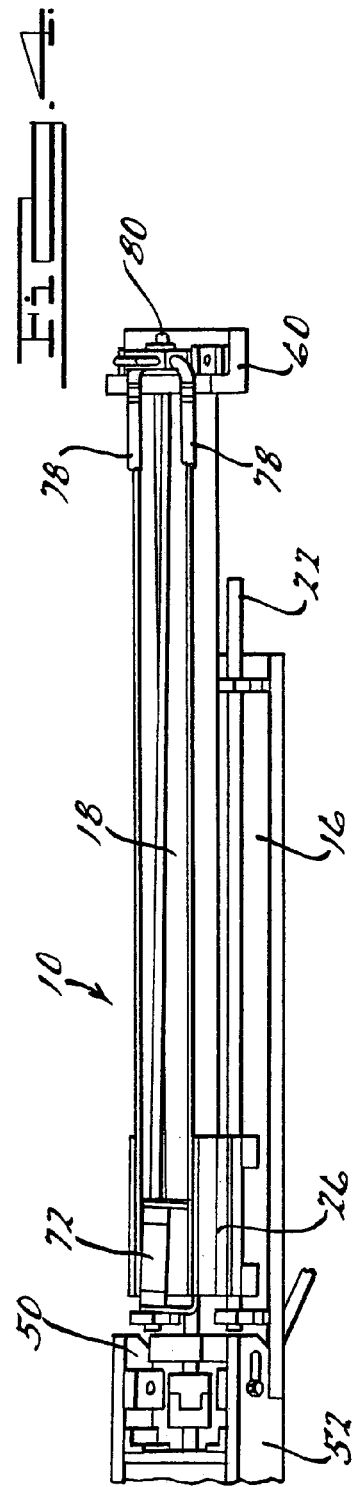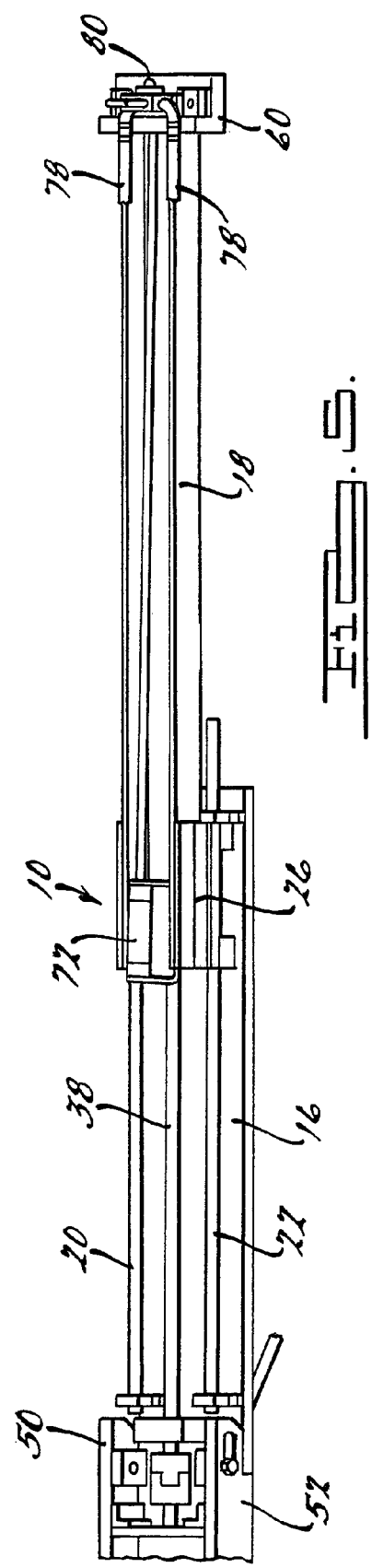

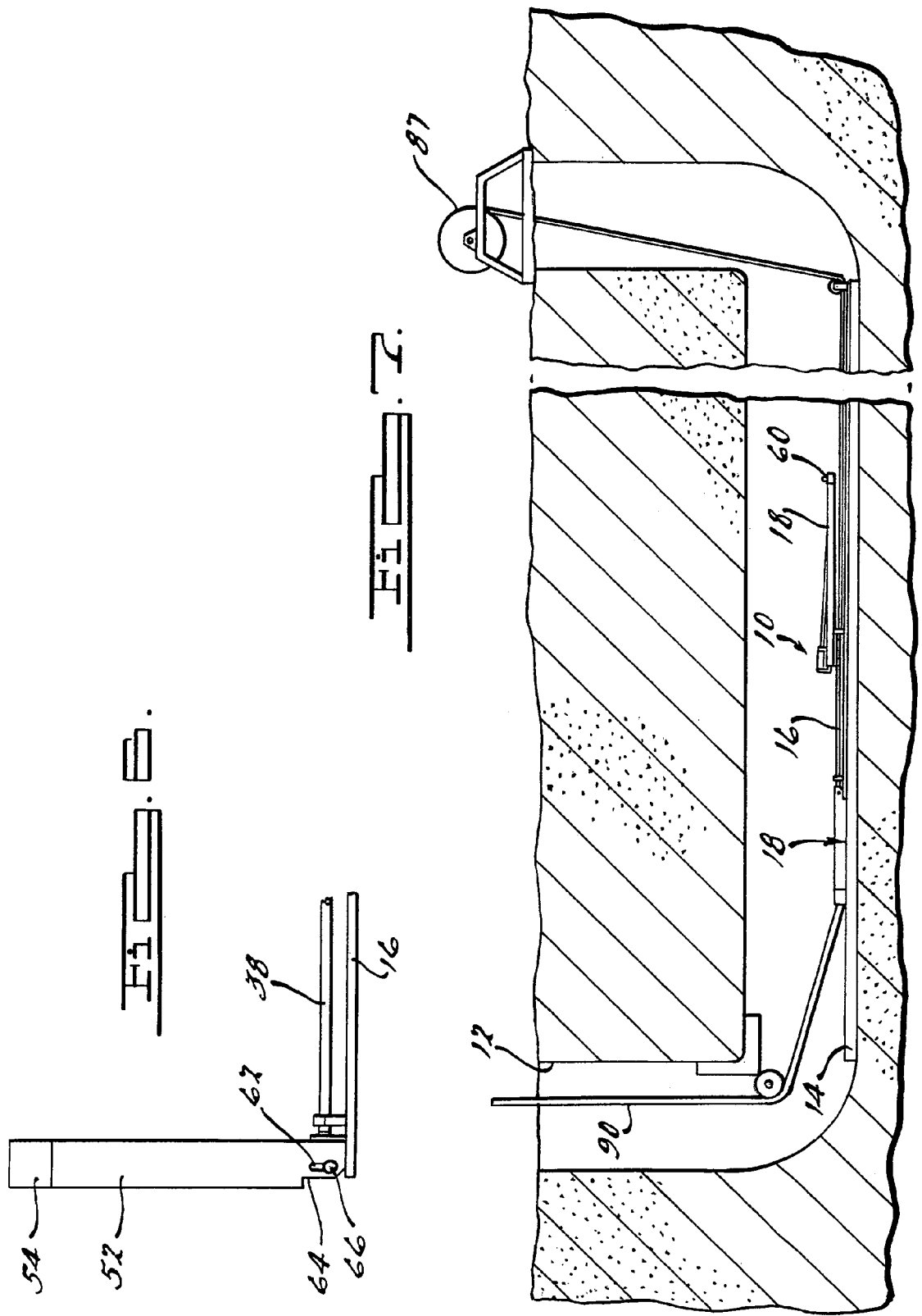

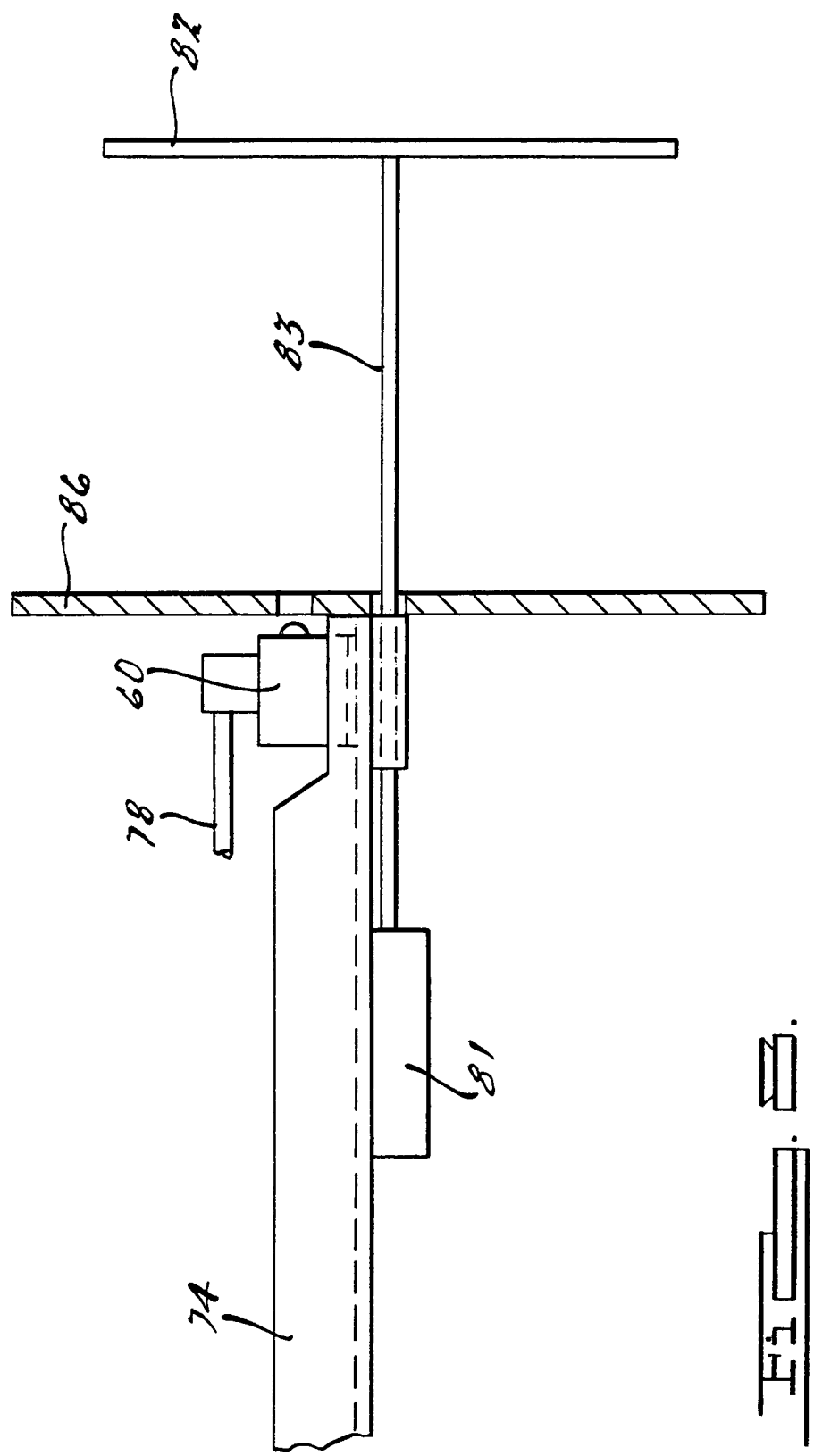

SPRAYED IN PLACE PIPE LINING APPARATUS AND METHOD THEREOF

FIELD OF THE INVENTION

The present invention generally relates to apparatuses and methods for coating the interior surface of a pipeline and more particularly relates to spraying a coating to form a liner within a pipeline environment.

DESCRIPTION OF RELATED ART

It is well known in the prior art to recondition the interior of pipes within existing or new sewer or another type of under ground pipe systems by any of the known prior art methods and apparatuses. Many of the under ground pipelines maybe corroded, have other problems that require fixing or total replacement or may be a new pipe section that requires a liner. Total replacement of these pipelines is very often both economically and practically not feasible because of downtime of the pipeline and the costs involved in excavating and laying new pipelines. Hence, this prior art method of locating the most seriously deteriorated sections of a pipeline and then excavating such section of pipe and patching or replacing that section with new pipe, is very expensive and time consuming and only delays the inevitable deterioration of the rest of the pipeline and frustrates users and owners of the pipeline system because of the on going work needed to keep the systems operating.

There also are many known insitu form processes for cured in place pipe liners in the prior art. This is the most commonly used form of repairing deteriorated pipes in the prior art. One such method of insitu fixing of deteriorated pipelines includes pulling a flexible polyethylene liner pipe into and through the deteriorated concrete or metal pipeline area to form a continuous corrosion barrier. This pulled in liner pipe is then set to the interior surface of the pipeline being fixed. This setting is accomplished by curing the polyethylene liner to the pipe's internal surface.

Still another prior art insitu pipeline repair method includes the pulling through of deteriorated previously cut apart sections of pipeline a length of reversible pipelining material which has an adhesive material which bonds a flexible liner section to the interior surface of the pipeline being repaired. This method requires considerable excavation, pipeline cutting and reconnection thus increasing pipeline downtime and the expense of repairing deteriorated pipeline.

There have also been methods known in the prior art which have cement mortar lining applied directly to the passageway or pipeline surface by spraying, trowelling or other methods. The cement mortar lining may also be reinforced with metallic rods or the like. The cement mortar lining techniques are used in the prior art for large pipelines and passageways where entry by a worker is possible and applying of such materials therein is performed by the worker.

Still yet another method of applying liners to pipelines includes using a flexible lining tube in conjunction with a felt or absorbent layer or layers wherein the felt absorbent layers are impregnated thoroughly with a curable synthetic resin at ground level and then an impregnated bag is fed into the pipe liners passageway before the resin cures. This bag is then held to the surface by fluid pressure until the resin cures forming a rigid lining pipe inside the existing pipeline or passageway.

There even have been prior art systems, known as cured in place pipe (CIPP), that use a scaffolding type set up to create a head of water at the repair site inside the pipeline which will be used to invert the liner and activate a catalyst resin. The water is circulated and heated through any known process but must be specifically controlled such that the proper temperature is delivered to the catalyst resin which is used to create the liner pipe inserted therein and the pipeline being repaired. Generally, there is no bond between the liner and the pipe and an annular space occurs between the two. One difficulty encountered with these prior art methods is that the catalyst must be applied to the resin at a specific time after or at the same time the resin is inserted into the interior of the tube and before transferring the tube to the repair site. Once the catalyst is applied to the resin the resin begins curing and time is of the essence to properly locate the liner tube in place within the pipeline to be repaired. Any problems encountered will affect such timing and create liners that are not properly cured or shaped to the interior surface of the pipe thus providing for bulging or leaks which may allow water to seep between the liner placed within the pipe and the pipe itself.

It should also be noted that problems have been encountered in the prior art methods with the cured in place pipe liners, when the resin is activated via a catalyst such as heat or any other catalyst known, the resin tends to shrink away from the interior surface of the pipe and thus creates many air pockets or portions of the liner that are not directly adhered to the interior surface of the pipe. This reduces the effectiveness and durability of the liner. This will also increase the amount of repairs needed to the pipe after the liner is installed because of the water or any other seepage located between the liner outside surface and the interior of the pipeline being repaired.

Problems have also been encountered with prior art methods attempting to spray a liner onto the interior of a pipe being repaired. Many of these prior art spray systems would effectively just put an apparatus within the pipe and spray the liner directly onto the pipe after much excavation or other preliminary work has occurred. Furthermore, the expense and downtime of such spray in liners has adversely affected the choice to use such method in repairing problems. The spray in type liners have major problems with plugging of the spray tips used to apply such spraying to pipes or any other surfaces. Any type of sprayed liner or sprayed resin tends to clog the tip of the spray gun at very fast rates thus slowing down the repair process and increasing the cost by having to replace the head and or clean the head while also increasing the downtime of the pipe being repaired. Furthermore, problems have also been encountered with prior art spray lining methods wherein the spray coat does not cure quick enough and runs and sags occur away from the interior surface of the pipe or other apparatus being repaired. In these prior art systems the spray coating is applied to quickly with too much resin or coating being applied in that quick manner. The resultant sprayed in lining is characterized by excessive sags and runs which interferes with the flow of water or other liquid through the pipe. Furthermore, the prior art spray liners that have been used are very thin, 0.020 to 0.040 inch thick and are generally unacceptable for most applications.

Therefore, there is a need in the prior art for a sprayed in place pipe liner apparatus and method. There also is a need in the art for a sprayed in place pipe liner apparatus that overcomes the problem of the spray gun tip clogging and plugging at very short time intervals.

There also is a need in the art for a sprayed in place pipe method and apparatus that will slow down the coating application rate and not spray too much coating too fast thus leading to sags, runs and air pockets being formed by the spray process.

There also is a need in the art for a low cost easy to apply lining method and apparatus for fixing deteriorating pipelines throughout the infrastructures of cities without a lot of excavating or other above ground work. The non-excavation method is known as "trenchless technology". There also is a need for a spray in lining method and apparatus to spray a coating that cures quickly and allows for shorter downtimes of the pipeline being repaired.

SUMMARY OF THE INVENTION

One object of the present invention is to provide an improved sprayed in place pipe apparatus.

Another object of the present invention is to provide an improved method of spraying a liner into a pipe in place.

Yet a further object of the present invention is to provide a spray in place pipe liner apparatus that has a clog free tip for use in spraying the liner for longer time intervals.

Still another object of the present invention is to provide a sprayed in place pipe apparatus and method that will slow down the delivery rate of the liner onto the interior surface of the pipe being rehabilitated.

Still another object of the present invention is to provide a low cost more reliable method of rehabilitating deteriorated pipe.

Still another object of the present invention is to provide a liner for deteriorating pipes that is capable of being applied in a variety of thicknesses over a variety of surfaces without extensive prep work necessary for proper adhesion of the liner to the interior surface of the pipe.

Still another object of the present invention is to provide an easy and quick to apply method of lining existing deteriorating pipes with a potable material.

It is also an object of the present invention to provide a sprayed in place apparatus that will move the spray head with relation to the robot thus achieving an over lapping pattern and lengthening the spray pattern by a predetermined factor.

Another object of the present invention is to provide a sprayed in place apparatus that will have an air blow off mechanism to force air at a very high rate through a spray tip while not effecting the uniformity of the coating within the pipe surface.

Another object of the present invention is to provide a method not requiring destruction of yards or landscapes and one that minimizes disruption to neighborhoods as is usually required by CIPPS and the other lining techniques.

To achieve the fore going objects, a robotic apparatus for spraying a liner on the interior of a pipe structure is disclosed. The apparatus will include a base having guide rails connected to a surface of the base. The apparatus will also include a shuttle plate arranged on the guide rails. A gear mechanism will connect the shuttle plate and move the shuttle plate along the guide rails a predetermined distance. A motor will be secured to one end of the base and with a gear mechanism on the opposite end thereof. The apparatus will also include an extension arm secured to the shuttle plate. The apparatus will also include a spray head assembly connected to the extension arm which is capable of axial movement relative to the base thus allowing for an overlapping pattern to be sprayed on the interior surface of a pipe structure.

One advantage of the present invention is that it provides an improved sprayed in place pipe liner apparatus.

Still another advantage of the present invention is that it provides for an improved method of spraying a liner in place in deteriorating pipeline structures.

Still another advantage of the present invention is that the sprayed in place pipe apparatus uses a robot with a spray head attached thereto that moves with relation to the robot.

Still another advantage of the present invention is the ability of the spray in place pipe liner apparatus to spray in an over lapping pattern thus reducing the speed of the coating process and ensuring a more uniform liner without runs or sags.

Yet another advantage of the present invention is that the spray in place pipe liner apparatus includes a blow off mechanism attached to the tip of a spray gun thus nearly eliminating any plugging of the spray tip during operation of the lining apparatus.

Still another advantage of the present invention is the ability to rehabilitate deteriorated existing pipelines in a more cost effective and timely manner.

Yet another advantage of the present invention is the use of a quick cure coating such as a polyurea, polyurethane or combination to rehabilitate the interior surface of deteriorating pipelines.

Yet another advantage of the present invention is the ability of the spray in place pipe liner to adhere to a variety of surfaces and/or grooves or cavities found on the inside of a deteriorating pipe line structure.

Yet another advantage of the present invention is the ability of the spray in place apparatus and method to operate for longer periods of time thus reducing downtime of the pipe system being rehabilitated.

Still another advantage of the present invention is the ability to apply a liner at a varying degree of thickness with a varying degree of coating gel speeds.

Still another advantage of the present invention is the expulsion of the coating through the spray head onto a spinning disc which will disperse the coating onto the inside surface of the pipe being lined in a uniform manner thus ensuring no runs, sags or air pockets between the exterior portion of the liner and the interior surface of the pipe being rehabilitated.

Other objects, features and advantages of the present invention will become apparent from the subsequent description and the appended claims, taken in conjunction with the accompanying drawings.

BRIEF DESCRIPTION OF THE DRAWINGS

FIG. 4 shows the robotic apparatus according to the present invention in the fully retracted position.

FIG. 5 shows the robotic apparatus according to the present invention in the fully extended position.

FIG. 6 shows a side view of the motor module in its upright 90° position according to the present invention.

FIG. 7 shows partial cross section of the robotic apparatus according to the present invention in a pipe being rehabilitated.

FIG. 8 shows a partial side view of the spinner disk, shaft, air motor and splatter shield according to the present invention.

DESCRIPTION OF THE EMBODIMENT(S)

Figure 1:
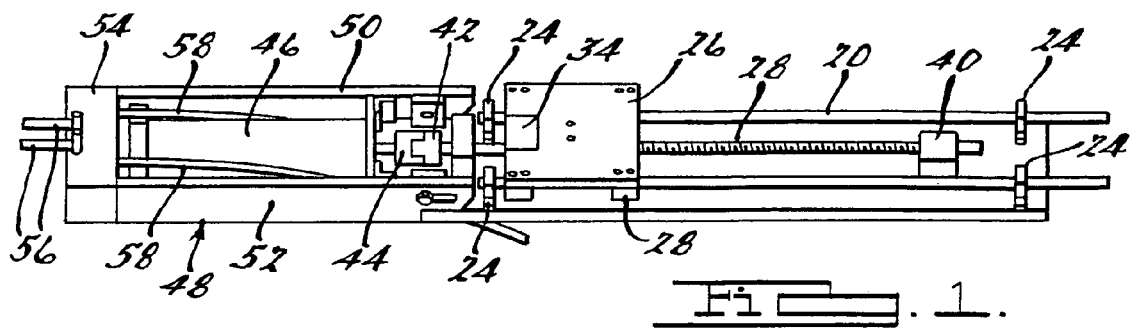
FIG. 1 shows a perspective view of the robotic base assembly according to the present invention.

Referring to the drawings, a sprayed in place pipe liner apparatus 10 and method according to the present invention is shown. The sprayed in place pipe liner apparatus 10 is for use in any known new pipeline or any known pipeline in need of rehabilitation. The sprayed in place pipeline apparatus 10 is capable of being placed through existing man hole covers or placed through another cut in the pipe, such as but not limited to those man made through excavating or the like. The spray in place pipe liner apparatus 10 in one embodiment will be a robot that is capable of having a camera mounted thereon and is capable of being moved through a pipe 12 and will disperse a fast cured coating onto the interior of the pipe 12 being lined. It should be noted that the robotic apparatus 10 may not have a camera attached thereto. The robotic apparatus 10 will be moved through pipelines for rehabilitation on sliding rails 14 that have curved lead ends on one, neither or both ends thereof. The sliding rails 14 will allow the robot 10 to be moved through the pipe 12 at a predetermined speed thus allowing for a fast cure coating to be properly applied at predetermined thinknesses within the pipe environment. It should be noted that the robotic spray in place apparatus 10 described herein is for use in rehabilitating pipelines of existing water and sewer systems but that any other type of structure having an interior surface maybe rehabilitated or lined with the robotic apparatus 10 or with a slightly modified apparatus that is capable of applying the fast cure coat in the shape of the surface being rehabilitated. It should be noted that in the embodiment shown in the drawings the robotic apparatus 10 will be capable of rehabilitating pipes in size from 6" in diameter to 48" in diameter or larger.

The spray in place liner apparatus 10 is a robot that is electronically controlled via a computer or other electronic workstation arrangement at a remote location during the rehabilitation process. The robotic apparatus 10 generally has two main components, a base assembly 16 and an extension arm 18.

Figure 2:
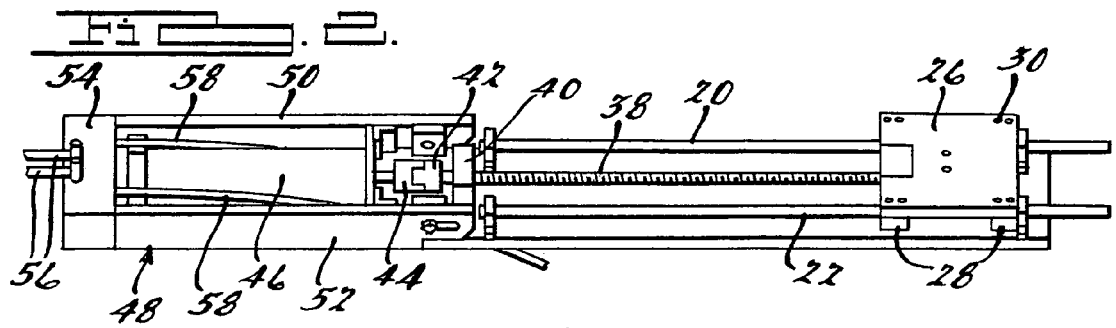
FIG. 2 shows a perspective view of the robotic base assembly having the shuttle plate at the front end of a ball screw according to the present invention.

FIGS. 1 and 2 show the base assembly 16. The base assembly 16 generally has a rectangular shape. In one embodiment the base assembly 16 is made of a steel material, however, it should be noted that any other metal, hard ceramic, plastic, or composite etc. is also capable of being used for the base assembly 16 depending on the environment and the design requirements. The base assembly 16 has a plurality of orifices therethrough for connecting other devices or apparatuses thereto. A first 20 and second guide rail 22 are connected to a top surface of the base assembly 16. The first and second guide rails 20, 22 are generally cylindrical in shape and are parallel to another. The guide rails 20, 22 are located along the outer edges of the base assembly 16. A guide rail bracket 24 is located at each end of the guide rails 20, 22 or near each end of the guide rails 20, 22 and each of the guide rail brackets 24 are secured to the top surface of the base assembly 16. The guide rails 20, 22 are then arranged within an orifice of the guide rail brackets 24 and secured therein via fasteners or any other known method of securing a guide rail 20, 22 to a bracket 24. Each of the guide rails 20, 22 are made of steel but it should be noted any other metal, plastic, ceramic, composite etc., may also be used.

A shuttle plate 26 having a generally square shape is slidingly engaged with the first 20 and second guide rails 22 on the base assembly 16. The shuttle plate 26 generally is made of a steel material however, it should be noted that any other metal, hard plastic, ceramic, composites or the like maybe used for the shuttle plate 26. The shuttle plate 26 includes a plurality of shuttle plate brackets 28 attached to a bottom surface of the shuttle plate 26. The shuttle brackets 28 are generally located at or near each corner of the shuttle plate 26. The shuttle plate brackets 28 are arranged along a common axis, such that two of the shuttle plate brackets 28 will be arranged around the first guide rail 20 while the other two shuttle brackets 28 will be arranged around the second guide rail 22. This will allow the shuttle plate 26 to move at in axial direction along the guide rails 20, 22 a predetermined distance with respect to the base assembly 16. In one embodiment the shuttle plate 26 is capable of axial movement in approximately an eighteen inch axial range. However, it should be noted that any other range of axial movement from 1" up to 48" maybe used depending on the design of the base assembly 16 and the robotic apparatus 10 for the spray in place pipe liner. It should be noted that the shuttle plate 26 includes a plurality of orifices 30 extending therethrough and extending partially therethrough for connecting the shuttle brackets 28 thereto and for connecting an extension arm 32 to the shuttle plate 26 on a top surface thereof. The shuttle plate 26 also includes a cut out 34 at a mid point of one side thereof for use in connecting a reverser nut 36 thereto. The shuttle plate 26 is arranged on the first 20 and second guide rail 22 such that the center point of the shuttle plate 26 will align with a center point of the base assembly 16. It should be noted that in one embodiment the shuttle plate 26 generally has a square shape but that any other known shape maybe used such as a rectangular, circle, etc. depending on the design requirements for the robot apparatus 10. It should further be noted that the shuttle plate 26 as shown in FIGS. 1 and 2 has a predetermined thickness but that any other thickness may be used depending on the strength needed and reliability needed of the shuttle plate 26.

A gear mechanism 38 is secured to a top surface of the base assembly 16 along a centerline thereof and between the first 20 and second guide rails 22. The gear mechanism 38 in the present invention is a reserving ball screw 38. The reversing ball screw 38 generally has a cylindrical shape with a threaded exterior surface. The ball screw 38 will be supported on both ends by a ball screw bracket 40. The brackets 40 will allow the ball screw 38 to be rotatably supported therein and allow for full rotate 360° rotation of the ball screw 38 within the ball screw brackets 40. The ball screw brackets 40 will be secured to the top portion of the base assembly 16 through predetermined orifices by any known fasteners. The ball screw 38 will have a predetermined length and thread ratio. In the embodiment shown the ball screw 38 will allow the shuttle plate 26 to move in an approximate 18" axial range along the guide rails 20, 22 of the base assembly 16. One end of the ball screw mechanism 38 will include a rotatable connector or bushing 42 attached thereto. This bushing 42 will be attached to a compatible rotatable connector or bushing 44 on one end thereof. The connector 44 will be attached to a motor 46 on the opposite end which will provide the rotational torque necessary to rotate the ball screw 38 in both a clockwise and counter clock wise direction. The rotation of the bushing 42 will rotate the ball screw 38 in either a clockwise or counter clock wise direction and in turn move the shuttle plate 26 along the guide rails 20, 22 in an axial direction with relation to the base assembly 16. The reverser nut 36 will be arranged around the ball screw 38 prior to insertion of the ball screw 38 into the ball screw brackets 40 on each end. The reverser nut 36 will then be secured via any known fastener to the bottom surface of the shuttle plate 26 thus allowing the shuttle plate 26 to move in the axial direction during rotation of the ball screw 38. The ball screw 38 will be rotated at a predetermined angular velocity thus allowing for the shuttle plate 26 to move along the guide rails 20, 22 at a predetermined speed.

It should be noted that the gear mechanism 38 maybe something other than a ball screw but in one contemplated embodiment the ball screw 38 is the most effective and reliable method of moving the shuttle plate 26 in the axial direction. However, it has been contemplated to use solenoids, a pulley and wire system, hydraulic cylinder etc. or the like to move the shuttle plate 26 in a required axial direction along the base assembly 16. It should be noted that the ball screw 38 will be capable of moving the plate 26 a predetermined distance to the front end of the base assembly 16 and then stop or return automatically to the rear end of the base assembly 16. This pattern of moving the shuttle plate 26 may continue on with any known type of repeating automatic pattern or in a pattern that has automatic delays built therein depending on the requirements of the coating being sprayed on to the interior surface of the pipeline.

FIGS. 1 and 2 also show the motor module 48 secured to one end of the base assembly 16. The motor module 48 generally includes a first 50 and second arm member 52 arranged parallel to one another and each connected to a motor plate 54 on the opposite end thereof. The motor plate 54 has a plurality of orifices therein, including orifices that allow for an air line to be attached, pneumatic cylinder air control line to be attached and a first and second material line to be attached for making the fast cure coating. Hoses 56 are attached to the orifices. The hoses 56 are designed for specific applications. The material being transferred via the hoses 56 are passed through the motor plate 54 and then transferred by other hoses 58 to the spray head 60 attached to the extension arm 18 of the robotic apparatus 10. It should be noted that the motor module arms 50, 52 are generally made of a steel material along with the motor plate 54 however any other know metal material, hard plastic, ceramic, composite or the like may also be used depending on the design requirements. The first and second motor modules arms 50, 52 generally have a predetermined sized oval orifice 62 or slot through a surface thereof. The orifice 62 is located adjacent to a predetermined sized notch 64 on one end thereof. The orifice 62 and notch 64 will allow for the motor module 48 to be pivoted 90° vertically to allow for the robotic apparatus 10 to be inserted into pipes 12 via different size man hole covers and different size entry points having a variety of angled openings. The rotating of the motor module 48 is shown in FIG. 6 with the motor module 48 in its vertical or 90° position. Any type of fastener, dowel, or pin can be used as the pivot point 66 of the motor module 48.

Arranged within the motor module arms 50, 52 and motor plate 54 is a motor 46 for use in the robotic apparatus 10. In the embodiment shown a DC motor 46 is used to rotate the ball screw 38 and is capable of providing variable cycle speeds in the approximate range of 6 seconds to 16 seconds from the shuttle plate 26 leaving the retracted position reaching the fully extended position and then returning to its retracted position. It should be noted that any other time frame from 1 second to one minute maybe used depending on the speed required of the shuttle plate 26 in conjunction with the fast cured coat being applied. It should also be noted that any other type of motor such as all electric motor, a solar motor, traditional fuel or alternative fuel motor, hydraulic motor or the like maybe used for the attached robot apparatus 10. The motor 46 is fastened in the motor module 48 via any known fasteners. The drive 68 of the motor 46 is connected to one end of the rotatable bushing 44 while the opposite end of the bushing 44 is connected to the bushing 42 connected to the ball screw 38, thus allowing for the rotational velocity to be passed from the motor 46 to the ball screw mechanism 38. The motor 46 will be controlled electrically via a computer or other electronic arrangement from a remote location on the surface or elsewhere in the pipeline environment. The electrical connections will be fed through a hose to the motor 46 and attached thereto on one end while the opposite end is attached to the control module, computer at the surface or other point of operation. It should be noted that it is contemplated to have the robotic apparatus 10 connected with up to 600' feet of cabling and hoses to allow for electrical and material feeding to the robotic apparatus 10 during the spraying of the coating onto the interior surface of a pipe 12. Attached to a front end of the motor module 48 arms is a lock plate 70 that which will lock the motor 46 in a predetermined position with relation to the bushings 42, 44 of the ball screw 38 and the drive 68 of the motor 46. The motor module 48 will be locked in place in the same vertical plane with the base assembly 16 during operation via any known fastener such as screws, bolts or the like. The fasteners have to be removed for any pivoting of the motor module 48.

The slots 62 located on the end of the motor module arms 50, 52 will have a locking feature that will require a predetermined distance of sliding to occur before the slots 62 will lock and allow the motor module 48 to rotate to it's 90° or other position with relation to the base assembly 16. The feed hoses 58 which are attached to the motor module and then onto the extension arm 18 will carry a variety of materials such as a first and second material for creating the fast cure coating. Other of the hoses 58 will be used to carry pneumatic air capable of providing the air necessary for the air motor 81 and blow off mechanism 77. Other hose bundles will be used to bring all electrical wires down to the motor 46 to control operation of the motor 46 and spray head 60 via electronic control from a trailer located at a remote position.

Figure 3:
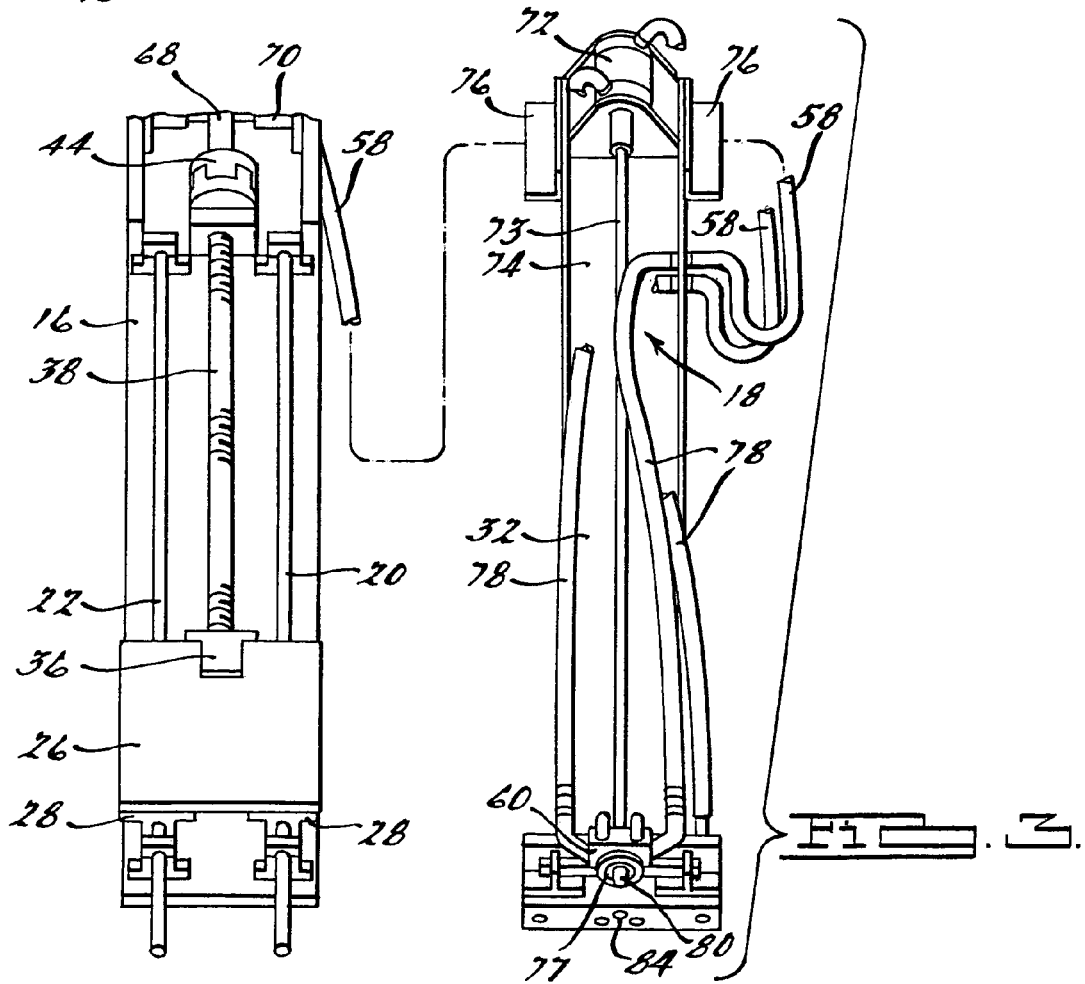
FIG. 3 shows a top view of the base assembly of the robotic apparatus according to the present invention along with a top view of the extension arm and spray head assembly for use with the robotic apparatus according to the present invention.

FIG. 3 shows the extension arm 18 and spray head assembly 60 for use in the spray in place robotic apparatus 10. The extension arm 18 includes a body 74 generally having a rectangular shape. It should be noted that the body 74 may be two L-shaped pieces abutting each other to create a "U" shaped cross section for the body 74. Attached to one end of the body 74 is a first and second extension arm base member and/or extension arm base member plate 76. These base members 76 will have a plurality of orifices therethrough and will be used to connected the extension arm 18 to the top surface of the shuttle plate 26 of the base assembly 16. Located on the end of the body 74 opposite the base members 76 is a spray head assembly 60. The extension arm 18 will include a plurality of feed hoses 78 carrying both the materials necessary to feed the fast cure coating and the pneumatic lines necessary to create the blow off mechanism for the spray head assembly 60 and to operate the pneumatic cylinder 72 that actuates the spray head assembly 60. A tube or conduit 73 is arranged between the cylinder 72 and spray head 60. The tube 72 may have a rod arranged therein to act as a push pull rod and in affect open or close the spray head 60 for its operations.

The hoses 78 will be looped such that the axial movement of the extension arm 18 relative to the base assembly 16 will allow the hoses 78 to extend between the shuttle plate 26 fully extended and retracted positions so there will be no kinks in the hoses 78 thus ensuring no pinching off of any supply of materials or air to the spray head assembly 60. The hoses 78 will be cradled in the channel formed by the body 74 on the bottom of the extension arm 18 to keep them inside the vertical dimensions of the extension arm 18 thus not affecting the spray pattern of the fast cure coat. Each of the hoses 78 will have any well known connector on each end thereof and will be connected to any well known connector of the spray head assembly 60 or the motor 46 or to the trailer where the materials will be stored for use in the robotic apparatus 10. A plurality of spray head nozzles and the like may be attached to the extension arm 48. All of these hose connections are well known in the art and may be any type of hose connection known in the art.

The extension arm base members 76 are connected to the top surface of the shuttle plate 26 by any known fasteners such as a nut and bolt arrangement and/or any screw known in the art. It should also be noted that any other type or method of connecting two plates together such as a weld or any other mechanical, chemical bonding means may also be used.

The spray head assembly 60 which is attached to the end of the extension arm 18 will include a spray gun that uses a spray gun tip 80 that will combine the two major components of the coating at the tip of the gun and then expel the coating through the tip 80 at a predetermined rate. The coating after being mixed will be expelled onto a spinning disk 82 which will disperse the coating through centrifugal forces onto the inside surface of the pipe 12 being lined. The spinning disk 82 will be attached to one end of the spray head assembly 60 via a shaft 83 arranged within an orifice 84. The spinning disk 82 will be controlled via a pneumatic motor or electric motor and via air or electricity brought from the trailer at the remote location. The spray head assembly 60 will also include a splatter shield 86 located near or at the spray tip 80. The shield 86 may have a cone like shape or any known shape. The splatter shield 86 will prevent the coating from being blown back into the spray tip 80 and contaminating the spray head assembly 60 during operation of the apparatus 10.

The disk 82 will be rotated at a predetermined speed and will use centrifugal forces to annularly distribute the coating in a 360° arc. In one embodiment the disk 82 will spin at approximately 10,000 to 12,000 rpms however, it should be noted that any other rpm can be used such as but not limited to 1,000 rpms to 30,000 rpms depending on the distribution required and the coating used, to ensure that no air is trapped within the coating thus creating air pockets or sagging in the liner being applied to the interior of the pipe 12. The distribution of the coating via the centrifugal force, when the coating is expelled into the spinning disk 82 will ensure no air is trapped in the coating and an even distribution of the coating throughout the entire pipe surface. This even distribution also includes any cavity or the like in the surface of the pipe thus allowing for a complete new liner matching the interior surface of the previously laid pipe. The extension arm 18 is capable of having more than one spray head spray tip 80 attached to the spray head assembly 60. This will allow for multiple coatings to be applied at the same time, but curing at different rates thus allowing for a first coating to be applied and cured and then a second coating to be applied directly thereafter. It should be noted that the spray head assembly 60 generally is made of a steel material but that any other type of metal, ceramic, hard plastic, composite or the like material may be used for the spray head assembly 60. The spray tip 80 and spray guns are any of the well known spray tips 80 and guns used in the spray coating. The spray tip 80 is arranged such that an air blow off mechanism 77, capable of applying high velocity high pressure air through the tip 80, is arranged on the extension arm 18. This blow off air mechanism 77 will force high velocity air around the tip 80 at the same time as the mixed coating materials are sent through the tip 80. This will create a fine spray of the coating which will be expelled onto the spinning disk 82 and then through centrifugal forces dispersed onto the interior surface of the pipeline being lined.

FIGS. 4 and 5 show the robotic apparatus 10 with the extension arm 18 connected to the base assembly 16. The extension arm 18 in FIG. 4 is in its fully retracted position prior to start up of the lining methodology. The robotic apparatus 10 as shown in FIG. 5 shows the extension arm 18 in the fully extended position at the far end of the base assembly 16 on the guide rails 20, 22. The methodology will have the shuttle plate 26 moving between the positions shown in FIGS. 4 and 5 in a continuous loop, thus allowing for an overlapping spray pattern to be applied to the interior surface of the pipe 12. FIGS. 4 and 5 show the extension arm 18 connected to the top of the shuttle plate 26.

FIG. 7 shows a cross section of a section of pipe to be rehabilitated via the robotic apparatus 10 and methodology of the present invention. FIG. 7 shows a pipe 12 from a existing sewer system or the like that needs rehabilitation. The robotic apparatus 16 including the base assembly 16, extension arm 18 and spray head assembly 60 will be inserted into the pipe 12 and on top of sliding rails 14 that may have curved lead ends on both ends thereof. The slide rails 14 maybe of any type known but are compatible with the base assembly 16 and will allow the base assembly 16 to slide at predetermined speeds through the pipeline environment. The robotic apparatus 10 will be placed on top of the sliding rails 14 and will be pulled forward into starting position by a detachable cable and winch system 87. The cable and winch system 87 will be fed backwards through the pipe 12 from the next manhole or entry point in the pipeline system. Once the robotic apparatus 10 is in proper starting position the cable will be unhooked and withdrawn from the pipeline system the robot 10 will then be pulled backwards in the direction from which it entered during the spray sequence by the hose assembly 90 which is attached to the motor module 48 on one end thereof. The hose assembly 90 will include all material for the fast cure coating and all electrical and pneumatic lines necessary to operate the robotic apparatus 10 as discussed above. The hose assembly 90 in one embodiment will be reinforced in tension by any known reinforcement method such as but not limited to an air craft cable integrated with the cable bundle to allow for tension strength and the ability to pull such cable bundles without kinking or adversely effecting the material feed lines, the air and the electrical lines.

The robotic apparatus 10 will be pulled at a predetermined speed through the pipe line such that it will permit application of the coating in very thin to very thick applications with a high degree of uniformity throughout the thickness and excellent surface adhesion to the interior of the pipe and excellent surface smoothness on the interior surface of the liner. It is contemplated that the thicknesses of the coatings can vary from anywhere from $1/18$" to 1" but other thicknesses are also contemplated depending on the interiors of the pipes being fixed. The robotic apparatus 10 will be moved at the predetermined speed that will permit the use of very fast curing systems and much slower curing systems depending on the design environment and type of lining to be inserted. Thus, the system is capable of allowing the use of faster cure coatings that will gel within approximately 4 seconds to slow fast cure coating systems that will gel any where from 20–40 seconds after application. It should be noted that the robotic system is also capable of being used to apply multiple coats of the liner thus releasing any trapped air efficiently from the sprayed in place liner.

The methodology of applying the liner to the interior surface of the pipeline being rehabilitated takes advantage of the movement of the robot 10 through the pipe at a predetermined speed along with the movement of the spray head 60 relative to the movement of the robot base assembly 16. Thus, the spray head 60 will be oscillating with respect to the base assembly 16 of the robotic apparatus 10 during the spraying of the fast cure coating. It should be noted that the fast cure coating used in the present invention is a polyurea coating sold under the Warrior and Structr Spray™ by Visuron Systems, Inc of Bay City, Mich. In prior art systems too much coating was applied too fast thus causing runs and sags in the liners being applied to the interior surfaces of pipeline systems. The current oscillation method will lengthen the spray pattern by up to 12 times. This lengthening of the spray pattern will allow for multiple passes for predetermined areas of the interior surfaces of the pipe. By lengthening the spray pattern up to 12 times, very thin to very thick coatings maybe applied with one pass of the robotic apparatus 10 through the pipeline system. Prior art systems would have to have a minimum of 8 passes to provide for a 1/8 thickness on the interior of the pipes. Even then too much coating was being applied too fast thus allowing for runs and sags to form in the walls thus forming air pockets between the liners and the interior surface of the pipe being rehabilitated. The longer spray patterns performed by oscillating the head 60 with respect to the robot base assembly 16, which is also moving at a predetermined speed, will eliminate runs and sags and will allow for any glitches within the pipeline environment to be covered via multiple passes. Thus, the oscillation part of the methodology solves the prior art problems of applying too much coating too fast thus eliminating any runs or sags and uneven distribution of the coating within the pipeline environment. This movement of the spray head 60 with relation to the robot base assembly 16 and over all movement of the robot apparatus 10 will achieve an over lapping pattern thus allowing multiple coats to be applied in a shorter time frame and effectively slowing down delivery of the coating to the pipe 12 being lined thus reducing the number of runs and sags while also increasing the adhesion of the sprayed in pipe liner to the pipe 12.

The methodology also will use an air blow off mechanism 72 that will deliver high velocity air to ensure clogging of the spray tip 80 does not occur during the up to one hour or more lining process. It has been shown in the prior art that when spraying fast gel systems, which generally are all systems that gel under 60 seconds, a build up would tend to accumulate at the tip of a spray gun in a minute or so such that the spray pattern becomes highly distorted. This build up will rapidly become so large that it could plug off the flow of the coating from the spray tip. The pipe lining methodology and apparatuses discussed herein require a single continuous uninterrupted spray sequence of one hour of more in most applications. Hence, increasing the airflow will enhance the performance of the spray tip 80. However, it also must be balanced by having badly distorted spray patterns because entrained air which is trapped in the coating may cause trapped air voids in the liner to be applied to the interior surface of the pipe. Therefore, instead of keeping the low air flow to keep the coating in its proper density the present invention methodology will use an air flow rate that is much higher then that used in regular spraying. Thus, a very high air flow rate will be used to keep the spray tip 80 clean for the extended time period necessary for the pipe lining methodology. The much higher airflow will not interfere with the spray pattern because the distortion will have no effect due to the coating being disbursed onto the spinning disk 82 as described above. The extremely fine spray that will exit the spray tip due to the high air flow from the air blow off mechanism will efficiently displace any entrained air because of the velocity of the solids and density difference of the two materials as it impacts the interior pipe surface. Therefore, the air blow off mechanism will force high speed air at predetermined pressures through the spray tip 80 allowing for the spray tip to remain clean during the one hour or so operation of the spray in place lining apparatus.

The pipe lining apparatus 10 is capable of working in 300 to 600' sections of pipe at a time. Thus, an hour or more maybe necessary for the robot apparatus 10 to be applying the spray coating within the rehabilitated pipe. It should be noted that any other type of fast cure coating other than polyurea maybe used but polyurea is the preferred coating to be used because of its fast gel properties and potable characteristics.

This methodology and apparatus will allow for more cost efficient, more reliable and more durable pipe linings for deteriorated pipelines that need rehabilitation. The methodology will be capable of operating in 300' to 600' intervals and completing such a section within an hour to two hour worth of man hours. This will have less downtime for the pipe system being rehabilitated and more efficiently and cost effectively allow for pipes to be rehabilitated to near new. With the fast cure coatings forming to any irregularity on the interior of the pipe there is less chance of any air pockets forming thus the rehabilitated pipe will last much longer then any insitu method and even longer than replacing the pipes by excavating and replacement or other high cost methods.

It should be noted that a trailer will be the operation center for the methodology and apparatus and will be located adjacent to a man hole cover where the rehabilitation of the pipe is being worked. The trailer will house all electronic apparatus, all pneumatic apparatus and the materials necessary to create the fast cure coating within the trailer. Thus, the rehabilitation can occur during any weather conditions, thus increasing efficiency and decreasing downtime of the pipeline system being rehabilitated. It should be noted that the system will operate such that one half gallon to one gallon of coating will be sprayed per minute during prime and efficient operation of the apparatus and methodology involved. The polyurea is a dual component system that uses an A material and a B material and is approximately delivered at 2500 psi and will cure within 4 to 5 second tack free from its application to the inside surface of the pipeline process. Thus, the rehabilitated pipes will be capable of operation within a matter of hours from the coating being applied thereto.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention maybe practiced otherwise than as specifically described.

What is claimed is:

1. An apparatus for spraying a liner on the interior of a structure, said apparatus including:
   a base;
   a guide rail connected to a surface of said base;
   a shuttle plate arranged on said guide rail, said shuttle plate slides along said guide rail a predetermined length of said base;
   a gear mechanism contacting said shuttle plate;
   a motor attached at one end of said base;
   an extension arm secured to said shuttle plate; and
   a spray head assembly connected to said extension arm.

2. The apparatus of claim 1 wherein said predetermined length is approximately between ten and twenty four inches.

3. The apparatus of claim 1 wherein said extension arm is secured to said shuttle plate on one end thereof, said spray head assembly secured to an opposite end of said extension arm.

4. The apparatus of claim 1 wherein said spray head assembly having a disk arranged within an orifice of said spray head assembly.

5. The apparatus of claim 4 wherein said spray head assembly will spray the liner at a predetermined flow rate in conjunction with an air blow off mechanism and said disk.

6. The apparatus of claim 5 wherein said spray head assembly will oscillate with respect to said base, said base moving at a predetermined speed with respect to the structure.

7. The apparatus of claim 4 wherein said disk being mounted at 90° to an attaching shaft.

8. The apparatus of claim 4 wherein said disk being mounted at up to a 20° oblique angle with rotation to an attaching shaft, so as to dispense a wider spray pattern from said disk.

9. The apparatus of claim 1 wherein said spray head assembly having a splatter shield.

10. An apparatus for spraying a liner on the interior of a structure, said apparatus including:
    a base;
    a guide rail connected to a surface of said base;
    a shuttle plate arranged on said guide rail;
    a gear mechanism contacting said shuttle plate, said gear mechanism includes a ball screw;
    a motor attached at one end of said base;
    an extension arm secured to said shuttle plate; and
    a spray head assembly connected to said extension arm.

11. The apparatus of claim 10 wherein said ball screw moves said plate in one direction and then automatically reverses direction.

12. An apparatus for spraying a liner on the interior of a structure, said apparatus including:
    a base;
    a guide rail connected to a surface of said base;
    a shuttle plate arranged on said guide rail;
    a gear mechanism contacting said shuttle plate;
    a motor attached at one end of said base, said motor is secured to a coupling, said coupling connected to said base;
    an extension arm secured to said shuttle plate; and
    a spray head assembly connected to said extension arm.

13. The apparatus of claim 12 wherein said coupling having at least one slot therein.

14. The apparatus of claim 13 wherein said coupling pivots in a 90° arc with relation to said base.

15. The apparatus of claim 12 further including a remote operation unit connected to said coupling via a bundle, said remote unit electrically in communication with said motor.

16. An apparatus for spraying a liner on the interior of a structure, said apparatus including:
    a base;
    a guide rail connected to a surface of said base;
    a shuttle plate arranged on said guide rail;
    a gear mechanism contacting said shuttle plate;
    a motor attached at one end of said base;
    an extension arm secured to said shuttle plate;
    a spray head assembly connected to said extension arm; and
    a rail system on an interior surface of the structure.

17. The apparatus of claim 16 wherein said base moves in a predetermined direction on said rail system.

\* \* \* \* \*